No. 704,956. Patented July 15, 1902.
W. H. COTTON.
ELECTRIC GENERATOR.
(Application filed Feb. 5, 1902.)
(No Model.) 3 Sheets—Sheet 1.

Witnesses:
Arthur Seibold
E. M. Klatcher

Inventor:
Walter H. Cotton
By Laurie T. Gillson
Atty.

No. 704,956. Patented July 15, 1902.
W. H. COTTON.
ELECTRIC GENERATOR.
(Application filed Feb. 5, 1902.)

(No Model.) 3 Sheets—Sheet 2.

Witnesses:

Inventor:
Walter H. Cotton.
By Louis K. Gibson, Atty.

No. 704,956. Patented July 15, 1902.
W. H. COTTON.
ELECTRIC GENERATOR.
(Application filed Feb. 5, 1902.)
(No Model.) 3 Sheets—Sheet 3.
Fig. 7.
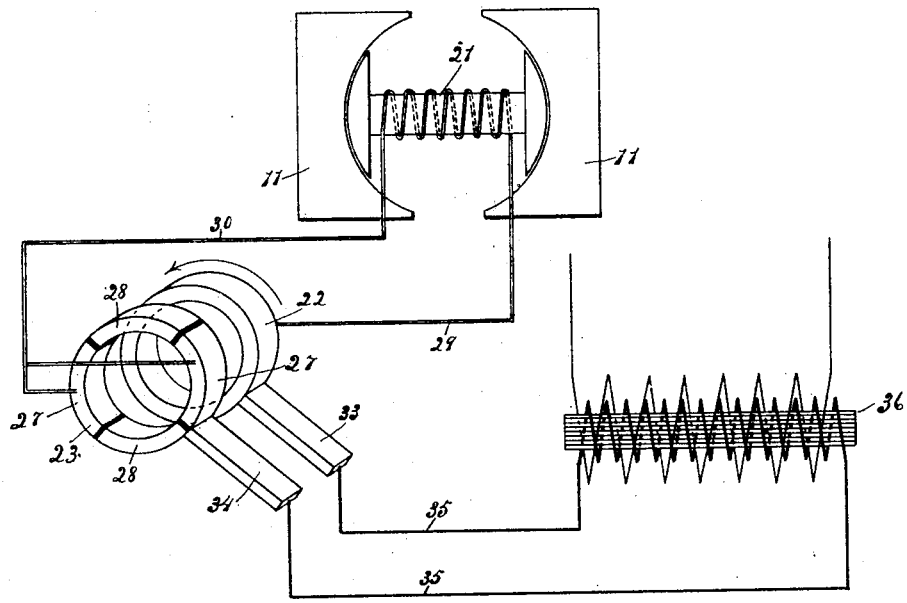
Fig. 6.
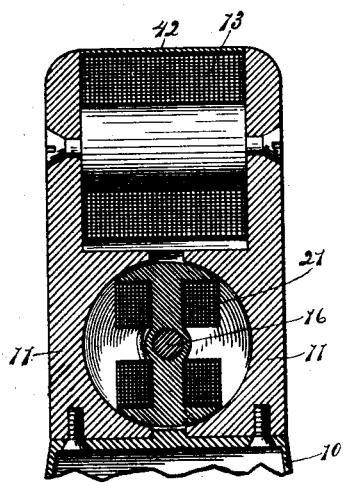
Fig. 8.
Witnesses:
Inventor:
Walter H. Cotton
By

UNITED STATES PATENT OFFICE.

WALTER H. COTTON, OF CHICAGO, ILLINOIS, ASSIGNOR OF SEVENTEEN-TWENTIETHS TO HARRY L. PECK, PHILLIP HICKLEY, AND WILLIAM P. OWENS, OF CHICAGO, ILLINOIS.

ELECTRIC GENERATOR.

SPECIFICATION forming part of Letters Patent No. 704,956, dated July 15, 1902.

Application filed February 5, 1902. Serial No. 92,690. (No model.)

*To all whom it may concern:*

Be it known that I, WALTER H. COTTON, a citizen of the United States, and a resident of Chicago, county of Cook, and State of Illinois, have invented certain new and useful Improvements in Electric Generators, of which the following is a specification and which are illustrated in the accompanying drawings, forming a part thereof.

This invention relates to a dynamo-electric generator for producing electric currents of high potential, such as are required for electrical igniting devices—as, for example, the sparking apparatus of explosive-engines, therapeutical apparatus, &c.

The invention comprises, in general terms, a generator having a working circuit through which passes all of the current generated and means for automatically breaking the circuit at periods when the current generated is at maximum potential.

The invention also comprises generally a generator and a transformer, the primary coil of which is in direct connection with the armature-coil of the generator, and means located in the connection for cutting out of the circuit the primary coil of the transformer, the parts being so related that the current developed in the armature will be cut or disrupted when the current therein is at maximum, whereby a current of high potential will be induced in the secondary coil of the transformer.

The invention further comprises the arrangement and combination of parts hereinafter fully described, particularly designated in the claims, and illustrated in the accompanying drawings, in which—

Figures 1, 2:
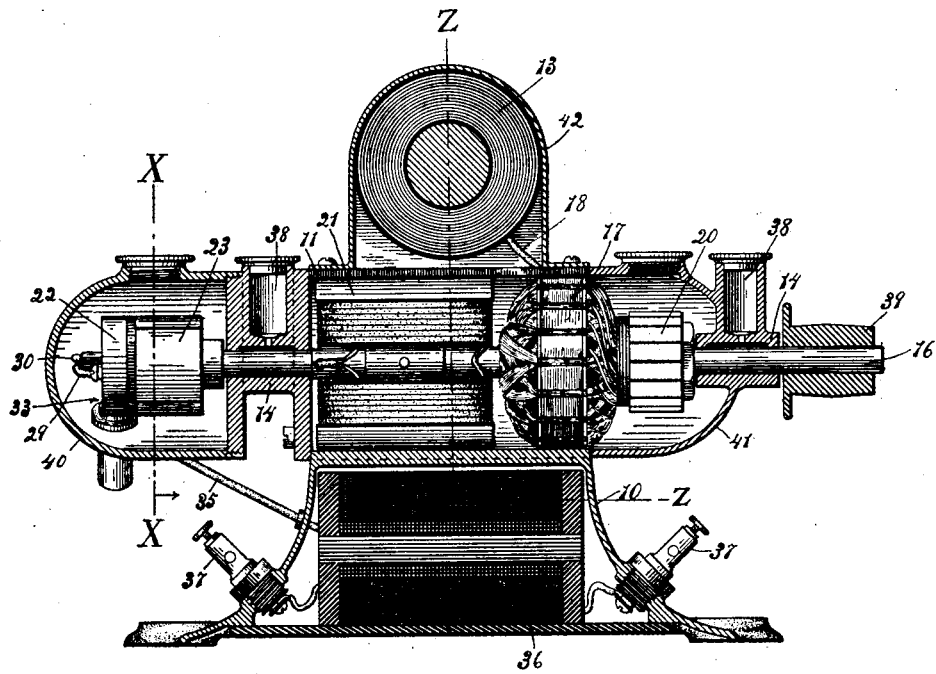
Figure 3:
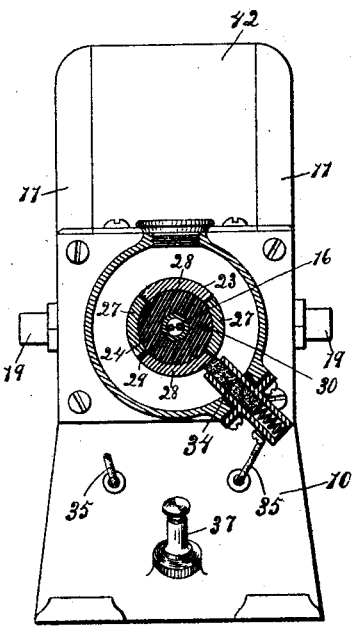
Figure 4:
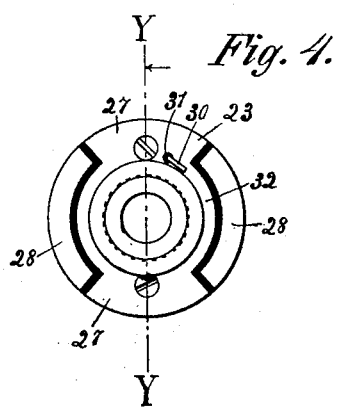
Figure 5:
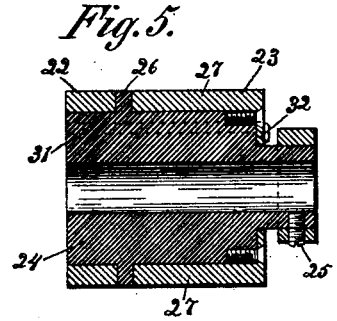

Figure 1 is a vertical longitudinal section on the line V V of Fig. 2, some of the parts being shown in full lines. Fig. 2 is a plan view of the generator. Fig. 3 is a section on the line X X of Fig. 1, showing particularly the arrangement of the plates or sections of one of the collecting-rings of the generating-armature commutator. Fig. 4 relates to a detail of the commutator. Fig. 5 is a section on the line Y Y of Fig. 4. Fig. 6 is a section on the line Z Z of Fig. 1. Fig. 7 is a diagrammatic view of the generator, showing the arrangement of the parts in operation; and Fig. 8 illustrates the current phase, showing the character of the current impulses derived by the primary coil of the transformer.

This invention is applicable either to a magneto or an electric-magneto generator. The latter is shown in the drawings.

In the organization of the machine in its entirety, 10 indicates a hollow base or bed plate, from the upper sides whereof extend the field-poles 11, provided with the usual field-coil 13.

Journaled in suitable bearings 14 in the frame of the machine and rotating between the field-poles 11 is a shaft 16, on which is fixed an armature 17 for exciting the field-magnet, the terminals 18 of the coil 13 being connected to brushes located in holders 19 and adapted to bear against the commutator 20 of the exciting-armature. Also fixed to the shaft 16 and between the poles 11 is an armature 21, in the winding of which an alternating current is induced, the current passing through the terminals of the coil to a commutator, from which it is taken for use. The parts heretofore described are arranged in substantially the usual manner and form no part of my invention except in so far as they relate to the mechanism now to be described.

The commutator employed by me is of novel construction and is so arranged and acts in such manner with its collecting-brushes that the current generated by the armature 21 is cut at maximum, the circuit being opened twice during every revolution of the shaft. To this end the said commutator comprises a pair of rings 22 and 23, which are secured to a sleeve of insulating material 24, fixed to the shaft 16, as by the set-screw 25.

The ring 22 is unbroken; but the ring 23, which is insulated therefrom by a rib 26, is composed of conducting-sections 27, alternating with insulated or non-conducting sections 28, and the shaft 16 being cored out one of the terminals, as 29, of the coil of the armature 21 passes through the shaft and is connected with the ring 22, while the other terminal, as 30, is led through the shaft and back through a passage 31 (shown in dotted lines in Fig. 5) in the insulating-sleeve to a plate 32, connecting the conducting-sections 27 at the opposite sides of the ring 23. The dead or non-conducting sections 28 are preferably made of metal insulated from the sections 27 in order to provide a smooth and even bearing-surface for the brushes.

In the construction illustrated only two conducting-sections in the ring 23 are employed, there being but two pole-pieces in the armature. It will readily be understood that if a greater number of pole-pieces are used the conducting-sections must correspond thereto.

Bearing each on one of the collecting-rings 22 23 are spring-pressed brushes 33 34, connected to the terminals 35 of the primary coil of a transformer 36. This transformer is preferably located in the hollow base 10 of the generator, and the terminals of the secondary coil thereof are led to binding-posts 37, to which the conductor in circuit with the igniting or other translating device may be connected.

The operation of the generator will be best understood by reference to the diagrammatic view seen in Fig. 7. The position of the armature 21 with relation to the poles 11 indicates that the current induced in the circuit thereof is at maximum, and at this point in the cycle one of the conducting-sections 27 of the ring 23 is just leaving the brush 34. The brush then coming in contact with the following dead section 28 the current is immediately disrupted, cutting out the armature-circuit with the primary coil of the transformer and inducing a current of high potential in the secondary coil thereof. For the next quarter-turn of the armature—that is to say, from its position as seen in Fig. 7 until it reaches the position seen in Fig. 6, or while the current would ordinarily be running down to zero—the circuit being open, no current is generating. At zero-point the second conducting-section of the ring 27 comes in contact with the brush 34, coacting with the ring 23, and the circuit is again closed and remains so during the third quarter of the rotation of the armature 21 or until the current again reaches maximum, when the second dead section of the ring 23 is moved into engagemement with the brush and the current again cut as before and a second impulse induced in the secondary coil of the transformer, and so on. The current induced in the primary coil of the transformer will be of ascending strength, as indicated in the diagram Fig. 8, wherein is shown the current generated during four rotations of the armature 21 and the periodic impulses, it being understood that the current is cut at maximum and generation started again at the zero position of the armature.

Oil-cups 38 may be provided over the shaft-bearings 14, and to one end of the shaft a driving-pulley 39 is fixed.

Preferably the brushes 33 34 of the generating-armature are mounted in a cap 40, which incloses the commutator-rings 22 and 23 and screws onto the end of the frame of the machine. By turning the cap 40 the brushes may be adjusted as desired with relation to the commutator-rings, and the brushes of the exciting-armature 17 are carried by a similar cap 41, bolted to the opposite end of the machine and inclosing the commutator 20. A hood 42 may also be placed over the field-coil 13. The caps 40 and 41 and hood 42 are designed to protect from dust the parts inclosed thereby.

While I have shown the exciting and generating armatures mounted upon a common shaft and within the influence of a common field, I do not limit myself to such arrangement, it being immaterial so far as the operation is concerned in what manner the field-magnet is excited. The arrangement illustrated, however, is preferred, as the parts are assembled in compact form, the construction of the machine is greatly simplified, and the operating parts are thoroughly protected from dust.

I claim as my invention—

1. A sparking apparatus comprising a dynamo having a working circuit through which passes all of the current generated, and a circuit-breaker constructed to break the circuit at periods when the generated current is at maximum potential.

2. In combination with an electric generator and its circuit, a circuit-breaker for opening the generator-circuit at the periods when the current generated is at maximum potential.

3. In an alternating electric generator, in combination, a field-magnet having poles, an armature movable in the magnetic field, a commutator having one of its rings divided into sections, alternate sections being respectively in and out of the armature-circuit, the parts being so disposed relatively that the commutator-brushes pass the division between such sections when the pole-pieces of the armature are at points in the magnetic field of the maximum magnetic force.

4. In a dynamo-electric generator, in combination, a generating-armature, a transformer the primary coil of which is in direct electrical connection with the generating-armature, and means in said connection for cutting out the coils of the generating-armature when the current generated thereby is at its maximum.

5. In a dynamo-electric generator, in combination, a generating-armature, a transformer the primary coil of which is in direct electrical connection with the generating-armature, and a cut-out in said connection for automatically cutting out the coils of the generating-armature when the current generated thereby is at maximum.

6. In a dynamo-electric generator, in combination, a generating-armature, a commutator mounted on and insulated from the armature-shaft and comprising a pair of rings one of which is composed of alternating conducting and non-conducting sections, one of the terminals of the armature being connected to the conducting-sections of the sectional ring and the other terminal to the other ring, a brush bearing on each ring, and a transformer, the primary coil of which is in electrical connection with the commutator-brushes.

7. In a dynamo-electric generator, in combination, a field-magnet, a shaft, an exciting-armature and a generating-armature on the shaft and within the field of the magnet, a transformer, the primary coil of which is in direct electrical connection with the generating-armature, and means in said connection for cutting out the coils of the generating-armature when the current generated thereby is at its maximum and cutting in the same when the current is at its minimum.

8. In a dynamo-electric generator, in combination, a field-magnet, a shaft, an exciting-armature and a generating-armature on the shaft and within the field of the magnet, a transformer, the primary coil of which is in direct electrical connection with the generating-armature, and an automatic cut-out in the connection for cutting out the coils of the generating-armature when the current generated thereby is at its maximum and cutting in the same when the current is at its minimum.

9. In a dynamo-electric generator, in combination, a hollow base, field-magnet pole-pieces extending above the base, a shaft mounted between the pole-pieces, an exciting-armature and a generating-armature fixed on the shaft, and within the common field of the pole-pieces, a transformer located in the hollow base and the primary coil of which is in direct electrical connection with the generating-armature, and a cut-out in the connection for cutting out the coils of the generating-armature when the current generated thereby is at its maximum.

10. In combination with a generator having a single working circuit, means for automatically breaking the circuit at periods when the current generated is at maximum potential.

WALTER H. COTTON.

Witnesses:
ARTHUR B. SEIBOLD,
LOUIS K. GILLSON.